United States Patent
Reda et al.

(10) Patent No.: US 12,330,098 B2
(45) Date of Patent: Jun. 17, 2025

(54) FILTER HOUSINGS, PURIFICATION SKIDS AND METHODS OF USE THEREOF

(71) Applicant: Fluitec N.V., Antwerp (BE)

(72) Inventors: Christopher Reda, Bayonne, NJ (US); Cristian A. Soto, Jersey City, NJ (US); Jatin N. Mehta, Jersey City, NJ (US)

(73) Assignee: Fluitec N.V. (BE)

( * ) Notice: Subject to any disclaimer, the term of this patent is extended or adjusted under 35 U.S.C. 154(b) by 998 days.

(21) Appl. No.: 17/298,094

(22) PCT Filed: Nov. 27, 2019

(86) PCT No.: PCT/US2019/063593
§ 371 (c)(1),
(2) Date: May 28, 2021

(87) PCT Pub. No.: WO2020/112990
PCT Pub. Date: Jun. 4, 2020

(65) Prior Publication Data
US 2022/0023782 A1 Jan. 27, 2022

Related U.S. Application Data

(60) Provisional application No. 62/772,897, filed on Nov. 29, 2018.

(51) Int. Cl.
*B01D 35/30* (2006.01)
*B01D 24/10* (2006.01)

(52) U.S. Cl.
CPC ............. *B01D 35/30* (2013.01); *B01D 24/10* (2013.01); *B01D 2201/24* (2013.01); *B01D 2201/301* (2013.01)

(58) Field of Classification Search
None
See application file for complete search history.

(56) References Cited

U.S. PATENT DOCUMENTS

| | | | |
|---|---|---|---|
| 5,840,953 A * | 11/1998 | Potts | C07F 7/04 |
| | | | 95/84 |
| 2004/0211717 A1 | 10/2004 | Mitchell | |
| 2005/0145548 A1 * | 7/2005 | Rhoades | B01D 61/22 |
| | | | 422/62 |
| 2005/0252845 A1 | 11/2005 | Kemmelmeyer | |
| 2007/0197411 A1 * | 8/2007 | Kaneko | C10M 145/14 |
| | | | 508/469 |

(Continued)

FOREIGN PATENT DOCUMENTS

| | | | | |
|---|---|---|---|---|
| EP | 2930276 A1 * | 10/2015 | ............. | B01D 24/10 |
| EP | 2930276 B1 | 12/2022 | | |

(Continued)

OTHER PUBLICATIONS

Extended European Search Report for European Application No. 19889875.1, mailed Sep. 13, 2022, 7 pages.

(Continued)

*Primary Examiner* — Chester T Barry
(74) *Attorney, Agent, or Firm* — Stratford Group Ltd.

(57) ABSTRACT

Described herein are a filter housing, a purification skid, a modular filter apparatus and methods of use thereof. The filter housing can accommodate one or more different types of filters and can be employed in an equipment skid.

20 Claims, 14 Drawing Sheets

(56) References Cited

U.S. PATENT DOCUMENTS

| | | | |
|---|---|---|---|
| 2009/0107930 A1 | 4/2009 | Goldman | |
| 2010/0140188 A1* | 6/2010 | Potts | C02F 1/004 |
| | | | 210/792 |
| 2010/0324226 A1* | 12/2010 | Hosotani | C08F 236/12 |
| | | | 525/338 |
| 2011/0036295 A1* | 2/2011 | Merkle | A23K 20/163 |
| | | | 119/6.5 |
| 2011/0258837 A1* | 10/2011 | Scannon | E04B 1/343 |
| | | | 29/33 R |
| 2014/0174296 A1 | 6/2014 | Schultz | |
| 2014/0306472 A1* | 10/2014 | Manickam | B66C 1/107 |
| | | | 294/81.5 |
| 2015/0114894 A1 | 4/2015 | Foohey | |
| 2017/0030872 A1* | 2/2017 | Ramakrishna | G01N 30/6047 |
| 2019/0367858 A1* | 12/2019 | Gunst | C12M 29/26 |
| 2021/0142920 A1* | 5/2021 | Singh | G21C 15/18 |

FOREIGN PATENT DOCUMENTS

| | | |
|---|---|---|
| FR | 2 692 162 A3 | 12/1993 |
| KR | 101304648 B1 | 9/2013 |
| WO | 2004/073832 A1 | 9/2004 |

OTHER PUBLICATIONS

International Search Report for International Application No. PCT/US2019/063593 mailed on Feb. 5, 2020, 2 pgs.

* cited by examiner

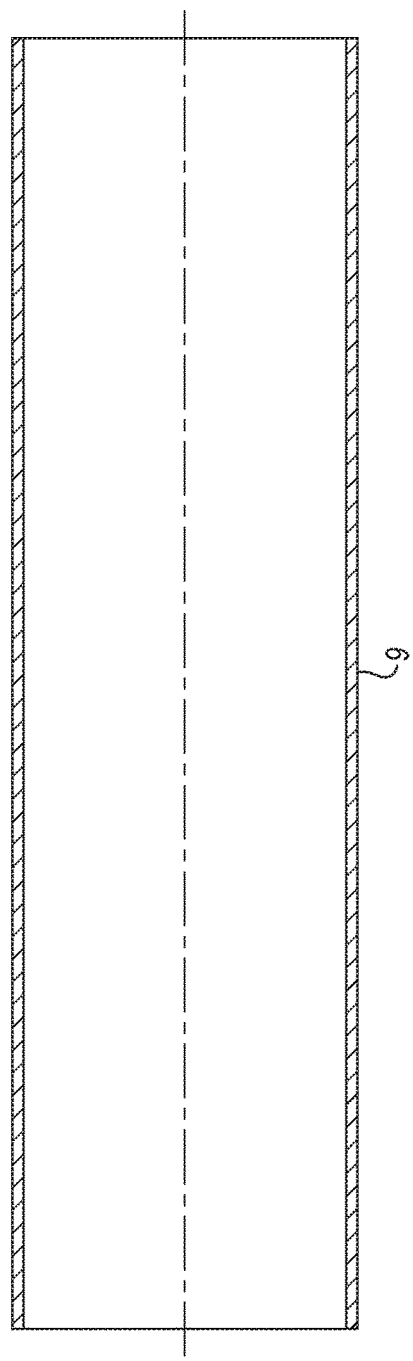
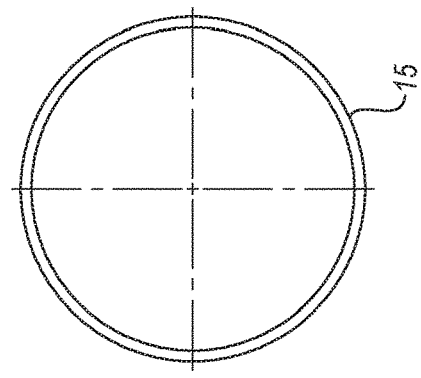
FIG. 2

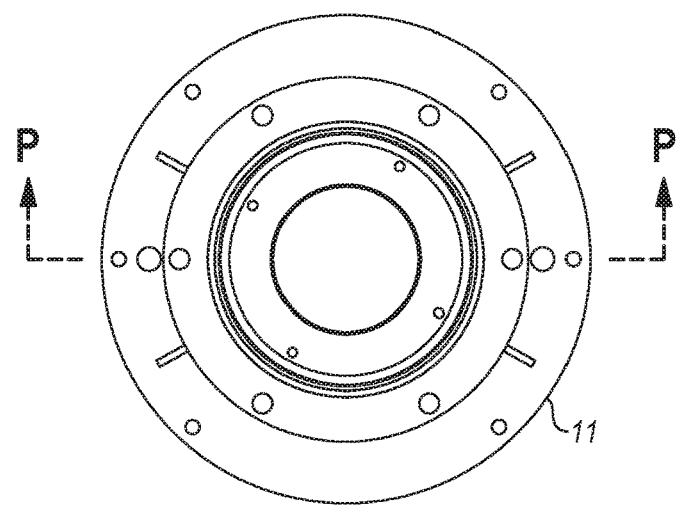
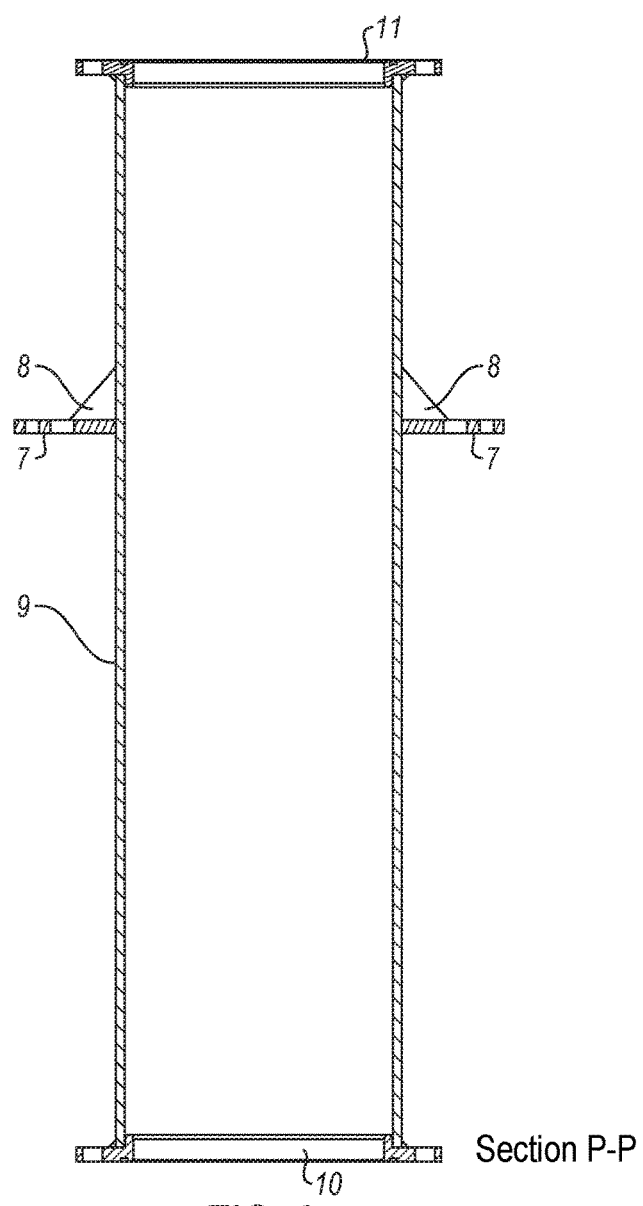
Section P-P
FIG. 3

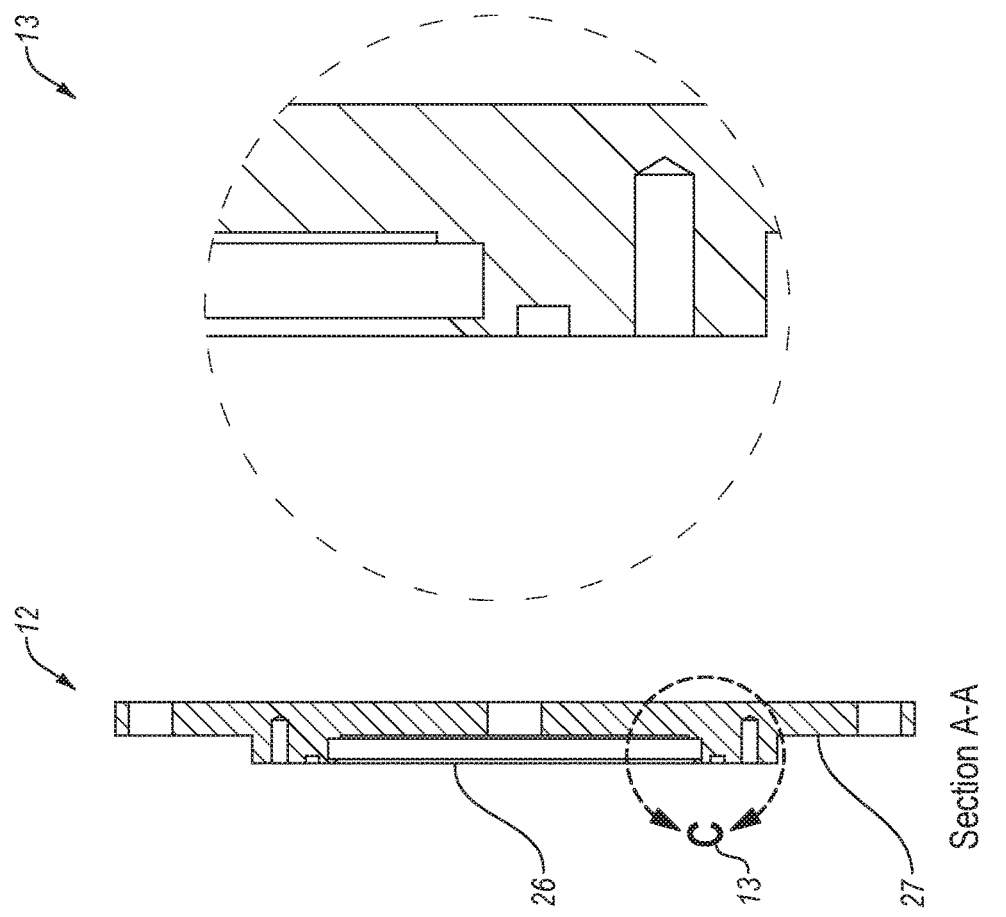
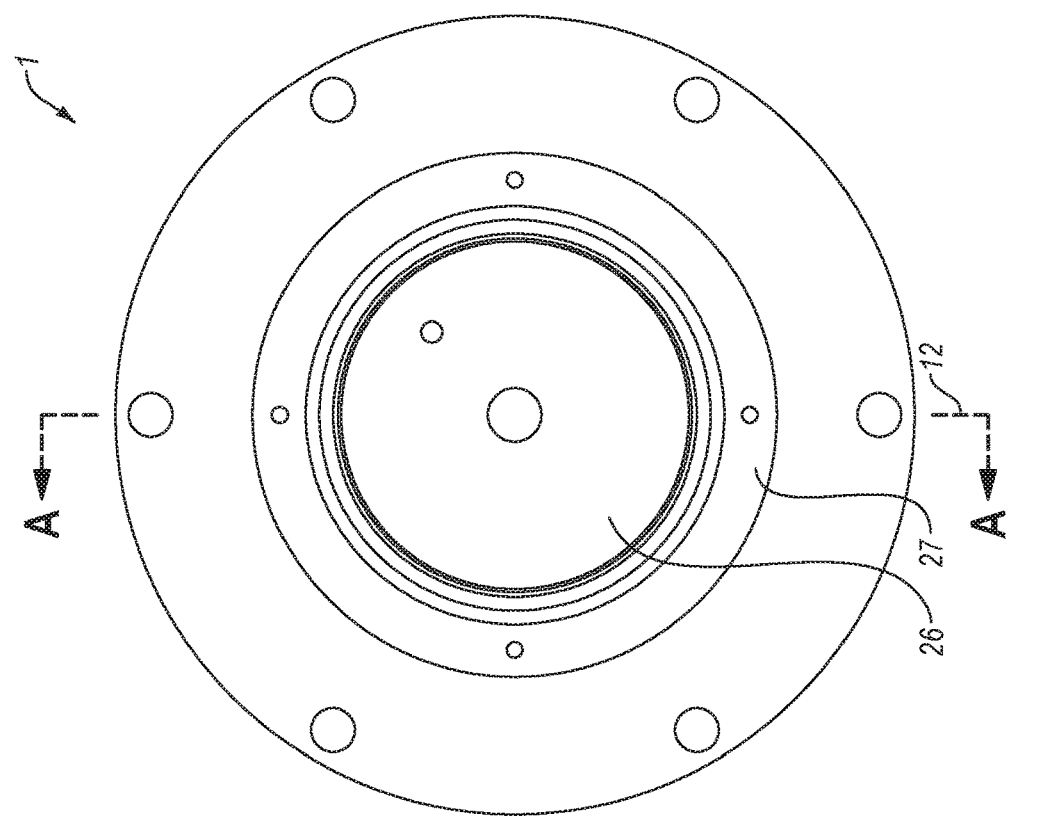
FIG. 6A  FIG. 6B  FIG. 6C

Section A-A

Section A-A

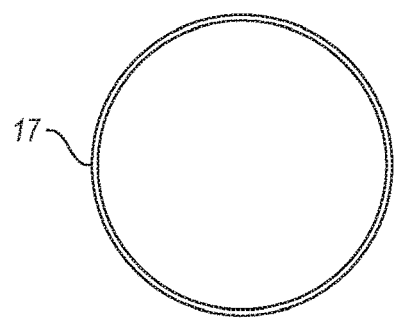
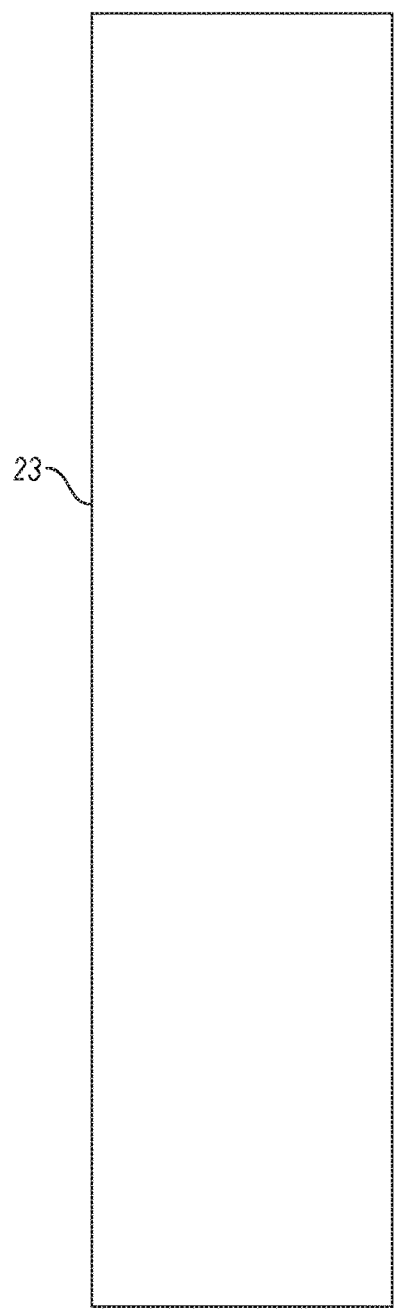
FIG. 9

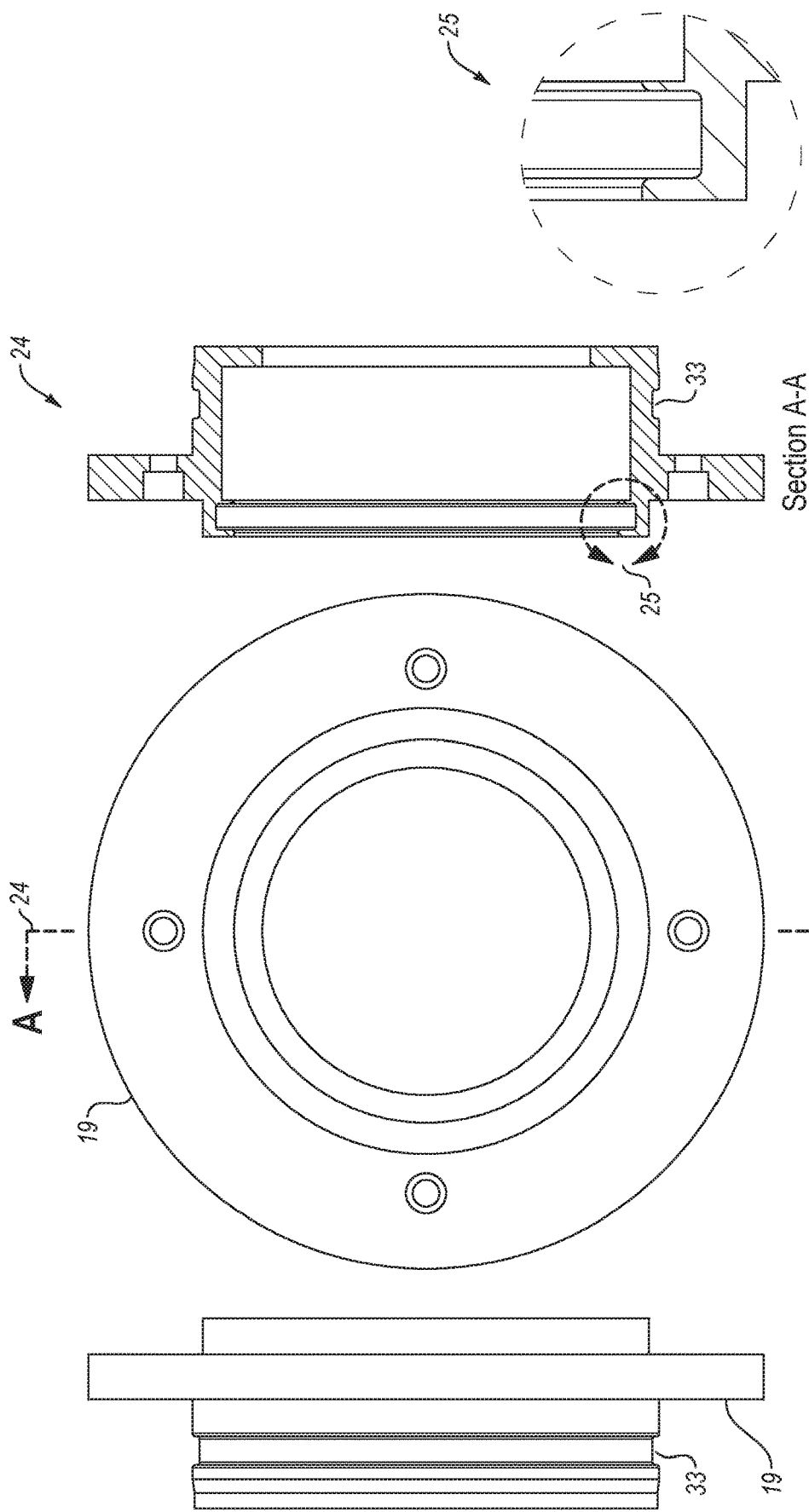

FILTER HOUSINGS, PURIFICATION SKIDS AND METHODS OF USE THEREOF

CROSS-REFERENCE TO RELATED APPLICATION(S)

This application is a national stage entry of International Application No. PCT/US2019/063493, filed on Nov. 27, 2019, which claims the benefit of Provisional Application No. 62/772,897, filed on Nov. 29, 2018. The contents of these applications are hereby incorporated by reference in their entirety.

FIELD OF THE INVENTION

TECHNICAL FIELD

The present disclosure relates to filter housings, purification skids and methods of use thereof. The filter housings and purification skids can accommodate one or more different types of filters, for example, filters that can be used for removing contaminants from lubricants.

BACKGROUND

In applications that employ lubricating fluids, it can be necessary to use a variety of filters to remove contaminants from the fluids. Filtering lubricating fluids can reduce wear and prolong the life of the fluid. For example, lubricants used for gas turbines and compressors are often filtered to remove solid particulates, liquid contaminants and other impurities generated during manufacturing and/or use of the lubricant. Different types of filters can be used depending on the application or system requirements. For example, selective adsorption media, depth media, water coalescing media and particle/mechanical filters may all be employed to remove contaminants from lubricants.

Each type of filter along with each different model of a particular filter type is typically housed in a casing designed specifically for that particular filter. As such, selection of equipment and skids are often based on the specific filter(s) employed. It is often necessary to buy and install a multitude of different filter housings, which can require specialized equipment designs tailored to each application.

Accordingly, there is a need for a filter housing design that can accommodate different types and quantities of filters and methods of use thereof. There is also a need for purification skids that can accommodate various filter types and methods of use thereof.

SUMMARY

According to various embodiments, disclosed herein is a filter housing comprising a housing body comprising a flange on a top end and a flange on a bottom end; the top end comprising a top plate and a top o-ring; the bottom end comprising a bottom plate and a bottom o-ring; an attachment fixture coupled to an exterior of the housing body. In embodiments, the housing body can cylindrical, for example, a tube. The housing body can be a plastic or a metal material, for example, the housing body can include at least one of polyethylene terephthalate, high-density polyethylene, polyvinyl chloride, low-density polyethylene, polypropylene, polystyrene, acrylic, polyurethanes, epoxides, phenolic resins, silicone, styrene, ethylene-propylene-diene monomer, nitrile, polybutadiene, polycarbonate, a thermoforming plastic, a thermosetting plastic, aluminum, steel, carbon steel, steel alloys, copper, magnesium and iron. According to embodiments, the top plate can include a plurality of orifices. The attachment fixture can include at least one skid and/or a plurality of handles. According to embodiments, the filter housing can include a center rod assembly for stacking depth media and particle filters. The bottom plate can include a support mesh and a mesh holder. In embodiments, the filter housing can include a replaceable canister assembly. The canister assembly can include end fittings on opposed ends of a main body of the canister assembly.

According to further embodiments, disclose herein is an oil purification skid comprising a filter housing comprising: a housing body comprising a flange on a top end and a flange on a bottom end; the top end comprising a top plate and a top o-ring; the bottom end comprising a bottom plate and a bottom o-ring; an attachment fixture coupled to an exterior of the housing body; a plurality of valves; and a fluid distribution unit. The housing body can be cylindrical, such as a tube. The housing body can be a plastic or a metal material. In embodiments, the top plate can include a plurality of orifices. The attachment fixture can include at least one skid and a plurality of handles.

According to embodiments, also disclosed herein is a modular filter apparatus, comprising: a particulate filter, a depth media filter and an ion exchange filter; a center post assembly; a media filter stacking component in a series or parallel configuration; a bottom plate; and an adapter plate.

BRIEF DESCRIPTION OF THE DRAWINGS

The present disclosure is illustrated by way of example, and not by way of limitation, in the figures of the accompanying drawings in which like references indicate similar elements. It should be noted that different references to "a," "an" or "one" embodiment in this disclosure are not necessarily to the same embodiment, and such references mean at least one.

FIG. 2 depicts a schematic of a housing tube of a housing in accordance with embodiments described herein.

FIG. 3 depicts a side view of a housing in accordance with embodiments described herein.

FIG. 6A depicts a bottom plate of a housing in accordance with embodiments described herein.

FIG. 6B depicts a support mesh of a bottom plate of a housing in accordance with embodiments described herein.

FIG. 6C depicts a support mesh holder of a bottom plate of a housing in accordance with embodiments described herein.

FIG. 9 depicts a body of a replaceable canister in accordance with embodiments described herein.

FIG. 12A depicts a side view of a bottom plate of a replacement canister assembly in accordance with embodiments described herein.

FIG. 12B depicts a bottom plate of a replacement canister assembly in accordance with embodiments described herein.

FIG. 12C depicts a blown up view of a bottom plate of a replacement canister assembly in accordance with embodiments described herein.

FIG. 12D depicts a blown up view of a bottom plate of a replacement canister assembly in accordance with embodiments described herein.

DETAILED DESCRIPTION

Figures 1A, 1B:
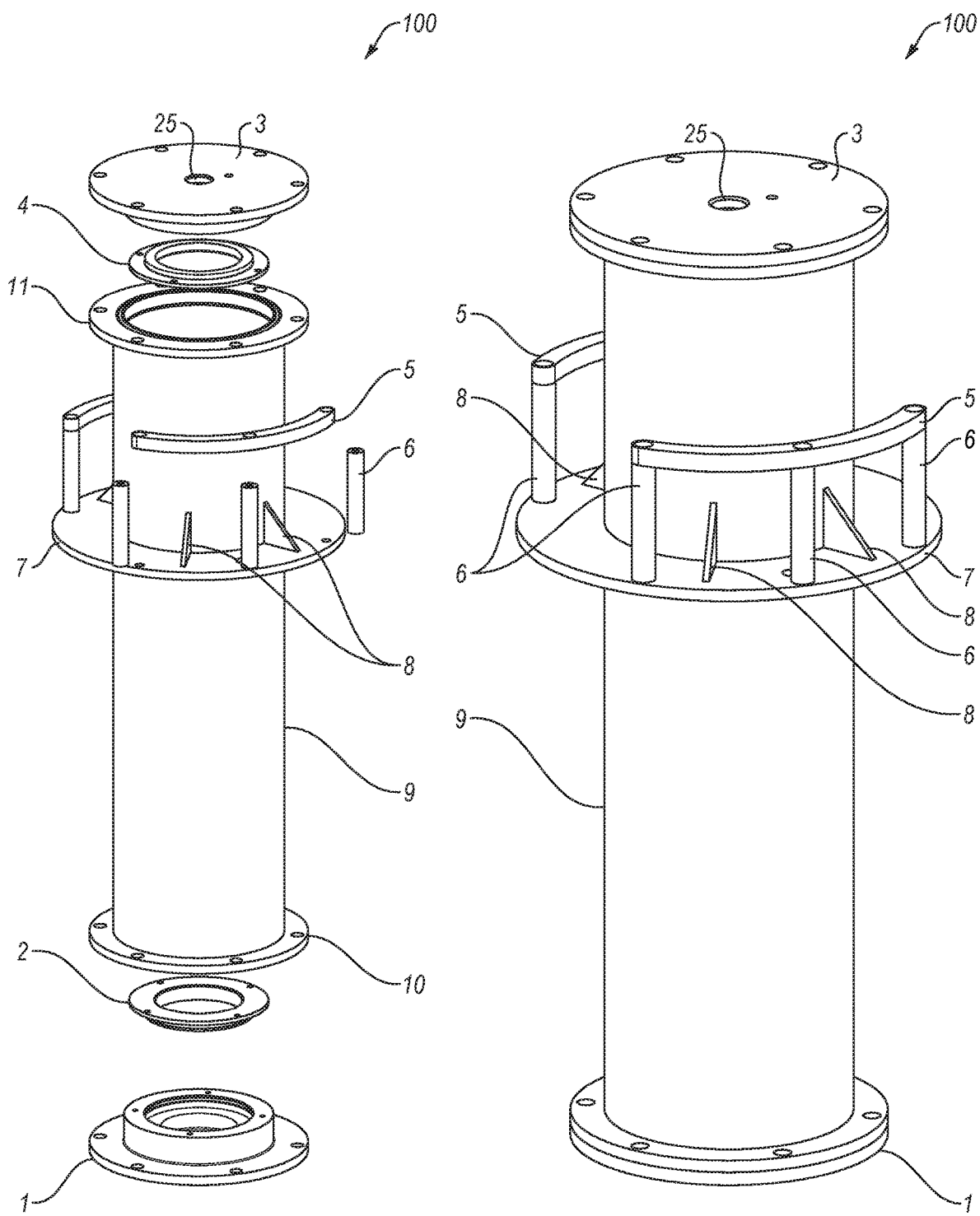
FIG. 1A is an exploded view of a housing in accordance with at least one embodiment described herein.
FIG. 1B depicts a housing in accordance with at least one embodiment described herein.

According to various embodiments, described herein is a modular variable skid for the purification of lubricant oils equipped with a housing and filter/cartridge design for different filtration technologies. In embodiments, a housing design as described herein can accommodate different types of filtration technology and different quantities of the same technology. This can resolve an issue of having different housings for different types of filtration technologies, which in turn requires the use of different machines/configurations (skids). In embodiments, the filtration technologies can be selected from, for example, selective adsorption media, ion exchange media, depth media, coalescing media (e.g., a water coalescing filter), stat free filter media and particle/mechanical filtration media. Filter housings and skids as described herein also allow the use of different quantities and different methods of replacing adsorption media.

According to embodiments, described herein is a variable flow skid equipped with a filter housing (e.g., a universal housing) capable of accommodating multiple types of filtration technologies. The housing can be have a lower plate (i.e., a bottom) and a top plate. In embodiments, the housing can include an attachment fixture for connecting the housing to a skid. The housing can also include handles on a body.

The housing assembly can accommodate various filtration configurations. For example, in embodiments, the bottom plate can accommodate a depth media assembly, which allows for depth media to be utilized for the removal of fine particulates (e.g., about 1 to about 6 micron) found in lubricating oils such as those utilized in turbine oils. In embodiments, bottom and top plates of the housing can incorporate a 140 mesh screen (about 105 micron) to hold or capture granular chemical adsorption media without the need of a canister to hold such media (e.g., diameter of about 0.2 to about 1.5 mm). In embodiments, such design can allow a canister to carry enough adsorption media (about 22 to about 50 pounds of adsorption media) to treat lubrication systems greater than about 8,000 gallons.

In embodiments, the bottom plate can also accommodate a replaceable filtration canister capable of holding about 12 to about 14 pounds of granular media. This configuration can allow for a lower cost canister to be replaced thus avoiding the replacement of the entire housing or the need for media to be recharged in the field. Notably, recharging can be difficult to execute at customer sites because the media is laden with oil and the particles may be difficult to manage from a housekeeping point of view. Embodiments of the filter housings and purification skids as described herein are intended to treat systems designed to operate with about 3,000 to about 8,000 gallons of lubricant.

Embodiments of various configurations as described herein can enable different maximum pressure drops, which are allowable because pressure drop is a function of various parameters. These parameters include media resistivity to flow, diameter and length of the canister, viscosity of the fluid and flow rate of oil going past the filtration media. According to embodiments, as long as the purification skid has a variable flow control, the pressure drop can be adjusted to remain below the maximum allowable pressure drop for each media and canister design. Embodiments of purification skids as described herein can have one or more flow control valves and one or more pressure relief valve having its own recirculation loop. This allows the user to control flow rates going past the media and not exceeding the rated maximum pressure while the skid accommodates excess flow with a spring loaded pressure relief valve and a recirculation loop.

According to various embodiments, described herein are filter housings, purification skids (e.g., modular filter apparatus) and methods of use thereof. In accordance with at least one embodiment, FIG. 1 shows an exploded view of a filter housing 100 having a bottom plate 1 that covers the bottom of a housing body 9 of the filter housing 100. The housing body can be formed of a plastic and/or a metal material, for example, the housing body can include at least one of polyethylene terephthalate, high-density polyethylene, polyvinyl chloride, low-density polyethylene, polypropylene, polystyrene, acrylic, polyurethanes, epoxides, phenolic resins, silicone, styrene, ethylene-propylene-diene monomer, nitrile, polybutadiene, polycarbonate, a thermoforming plastic, a thermosetting plastic, aluminum, steel, carbon steel, steel alloys, copper, magnesium and iron. When installed, the bottom plate 1 can adjoin with a flange 10 positioned about a distal end of the housing body 9. For example, the bottom plate 1 can be joined with flange 10 via screws, bolts, welded connections, etc. A bottom o-ring 2 can be received by the bottom plate 1 and, when the bottom plate 1 is installed, facilitates sealing the bottom of the filter housing 100.

A top plate 3 is disposed at an opposite end of the housing body 9 and covers the top of the body 9 of the filter housing 100. When installed, the top plate 3 can adjoin with a flange 11 positioned about an end of the housing body 9. For example, the top plate 3 can be joined with flange 11 via screws, bolts, welded connections, etc. A top o-ring 4 can be received by the top plate 3 and, when the top plate 3 is installed, facilitates sealing the bottom of the filter housing 100.

According to embodiments, filter housing 100 can include a fixture 7 attached to the housing body 9 via one or more brackets 8. The fixture 7 can include one or more handle assembly 5, 6 positioned around an outer diameter of the housing body 9 of the filter housing 100. The one or more handle assembly 5, 6 enables an operator to lift, lower and/or carry the filter housing 100. A flow port 25 permits fluid flow through the filter housing 100 and can be in fluid communication with a canister, which will be described in more detail below, received therein. The filter housing 100 can universally accommodate a variety of filter types and configurations including selective adsorption media, depth media, coalescing media (e.g., for water), particle/mechanical filters, ion exchange filters and stat free filters.

FIG. 1B shows an assembled filter housing 100 in accordance with embodiments described herein. As shown, the bottom plate 1 and top plate 3 are attached to flanges 10 and 11, respectively. The handle assembly 5, 6 enables an operator to grip the housing 100 and move it as necessary. The filter housing 100 includes one or more opening (not shown) for pressure gauges and sampling ports. When assembled, the filter housing 100 can accommodate a variety of filter types and canisters received therein.

FIG. 2 is a schematic view of the housing body 9. The housing body 9 can have a cylindrical shape. In embodiments, the housing body 9 can have a cross section of any shape, for example, a circle, square, rectangle, triangle, etc. In embodiments, the housing body 9 has cross-section of a circle. In certain embodiments, the housing body 9 may have a thickness of about 0.0625 in to about 0.5 in, or about 0.125 in to about 0.25 in. In one embodiment, the thickness of the housing body 9 may be about 0.25 in.

FIG. 3 depicts a side view of the housing body 9 in accordance with embodiments described herein. As shown, the fixture 7 is mounted concentrically about the outer surface of the housing 9. Brackets 8 can be right angle brackets according to embodiments. It should be noted that other types of brackets such as L-brackets, tethers and/or welding connectors can be used to attach fixture 7 to housing body 9. The housing body 9 can have a thickness of about ³⁄₁₆ in to about ½ in, or about ³⁄₁₆ in and a length of about 10 in to about 40 in, or about 30.8 in. Fixture 7 can be positioned about 10 in to about 30 in, or about 20 in above the bottom of housing body 9. Flange 11, as shown in FIG. 3, can have openings positioned about the perimeter of the flange 11.

Figure 4:
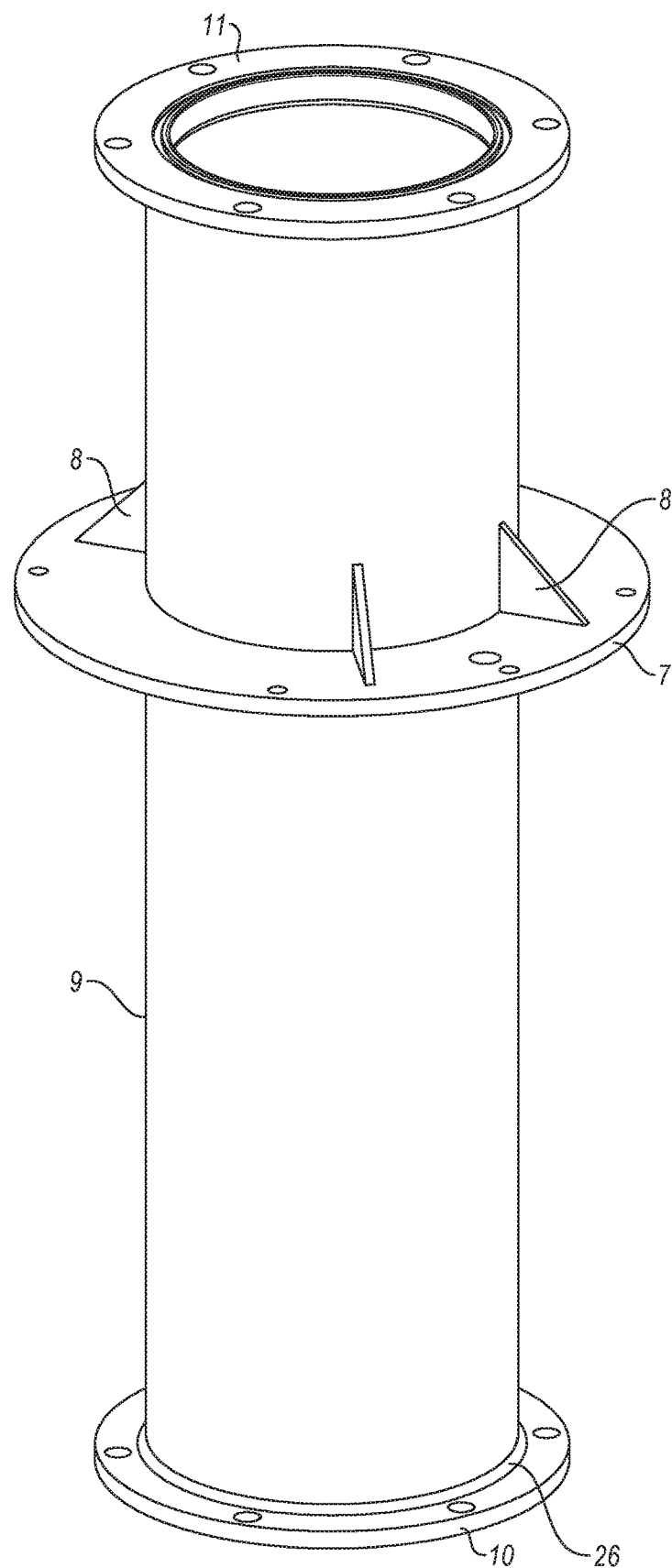
FIG. 4 depicts a schematic of a housing in accordance with embodiments described herein.

FIG. 4 shows an embodiment of the filter housing 100 having the attachment fixture 7 with support brackets 8. According to embodiments, the height of each perpendicular side of the support brackets 11 may be about 0.0625 in to about 0.25 in, or may be about 0.125 in. According to embodiments, a seal 26 around bottom plate 14 can have perpendicular sides of about 0.0625 in to about 0.25 in, or about 0.1875 in to about 0.25 in, or about 0.1875 in.

Figure 5:
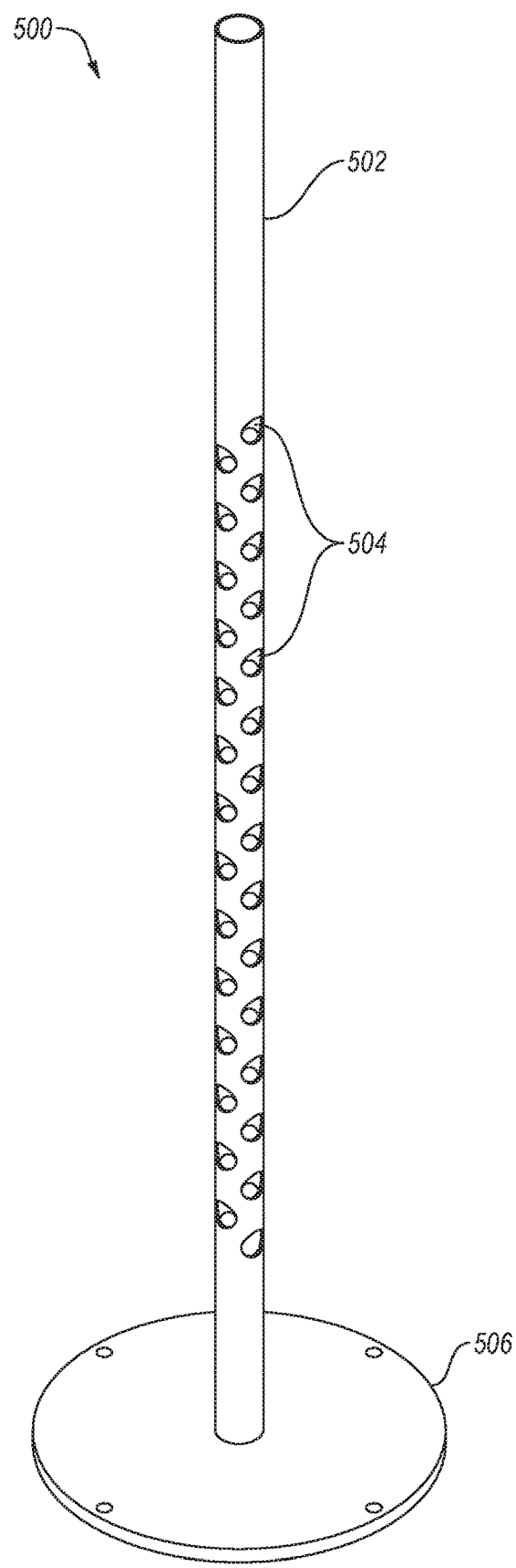
FIG. 5 depicts a center rod assembly for stacking filters in accordance with embodiments described herein.

In one embodiment, the filter housing 100 may include a center rod assembly 200 as shown in FIG. 5 on which to stack depth media filters and particle filters. The center rod assembly 200 may include a center shaft 502 having a plurality of orifices 504. The center rod assembly 500 may be affixed to a base 506. According to embodiments, bottom plate 1 may be designed to accommodate a depth media filter. In certain embodiments, a single depth media or two stacks of depth media is/are loaded on the depth media assembly. The depth media or stacks can be secured on an assembly rod 500 (FIG. 5) with thick and thin aluminum discs. Assembly rod 500 can be inserted inside the housing 100 and rest on the bottom of the housing assembly 100. The depth media filter can be secured using polymer (e.g., Viton) gaskets to create a seal. According to embodiments, the depth media filter assembly can be secured with a ¾-16 inch nut. A torque of about 20 to about 25 ft/pound, or about 23 ft/pound can be applied to secure the top nut on the depth media assembly stack. Depth media filters enable removal of fine particulates (e.g., about 1 μm to about 20 μm, or about 1 μm to about 6 μm) found in lubricating oils such as those utilized in turbine oils.

FIG. 6A shows a top view of bottom plate 1 of filter housing 100. According to embodiments, the bottom plate 1 can be configured to receive a mesh screen 26 (shown in FIG. 6B). The mesh screen 26 enables the filter housing 100 to hold granular chemical adsorption media without the need of a canister to be installed within the housing body 9. As shown in FIG. 6A, the bottom plate 1 can have a diameter of about 2.0 in to about 15.0 in, or about 10.2 in. The mesh screen 26 can be inserted into a center part of the bottom plate 1 and, according to various embodiments, can have a diameter of about 1 in to about 10 in, or about 4.445 in. The mesh screen 26 can include a flange 27 that holds the mesh screen to or within the bottom plate 1. The flange can have an outer diameter of about 1.5 in to about 12 in, or about 6.696 in. Further details of the mesh screen 26 are shown in the blown up schematic of FIG. 6C.

Figure 7A:
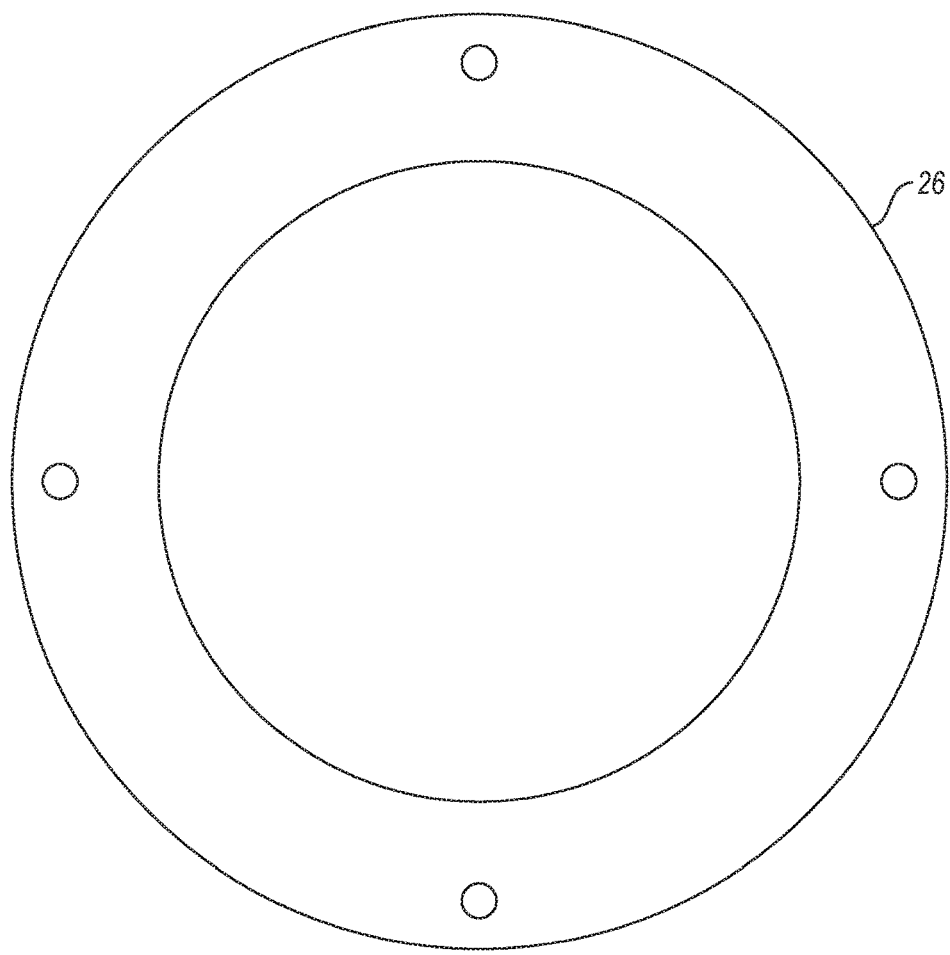
FIG. 7A depicts a top view of a support mesh holder of a bottom plate of a housing in accordance with embodiments described herein.
Figure 7B:
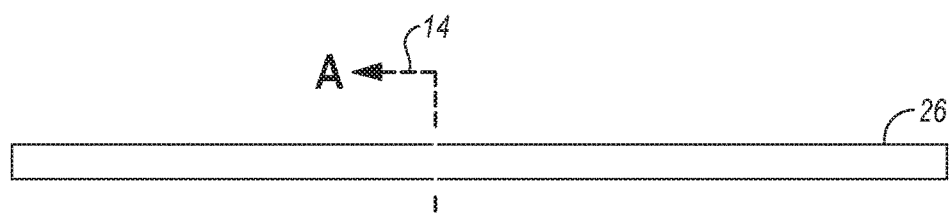
FIG. 7B depicts a side view of a support mesh holder of a bottom plate of a housing in accordance with embodiments described herein.
Figure 7C:
FIG. 7C depicts a blown up view of a support mesh holder of a bottom plate of a housing in accordance with embodiments described herein.

FIGS. 7A-7C show a detail schematic of mesh screen 26. Although the mesh screen 26 can be sized appropriately for an application, for example, based on the housing size, size of media granules, pressure drop, etc., according to embodiments, mesh screen 26 can have dimensions as shown in FIGS. 7A and 7C. The mesh screen 26 can be formed of any suitable material for lubricant applications. According to embodiments, mesh screen 26 can be formed of polymeric materials, glasses, metals, combinations thereof and mixtures thereof. For example, suitable materials include, but are not limited to, glasses, nylon, cellulose acetate, polyester, polyethylene vinylacetate (EVA), polypropylene vinylacetate (PVA), polyvinyl chloride (PVC), cellulosic polymers, polyurethane, stainless steel mesh, sintered metal (such as sintered metal discs and the like), metal membrane filters (such as silver membrane filters and the like) and the like, as well as combinations thereof and mixtures thereof. The membrane can alternatively be a material through which a fluid material additive can pass, for example, by diffusion (although not necessarily through pores), such as silicone rubber, polyethylene, polyvinylacetate, natural and synthetic rubbers, and other polymers and waxes, and combinations thereof and mixtures thereof. Such membranes are often referred to as semi-permeable membranes. In one embodiment, a "semi-permeable membrane" refers to a continuous film of a polymeric material permeable to fluid material, which permits diffusion of molecules through microscopic channels.

Figure 8A:
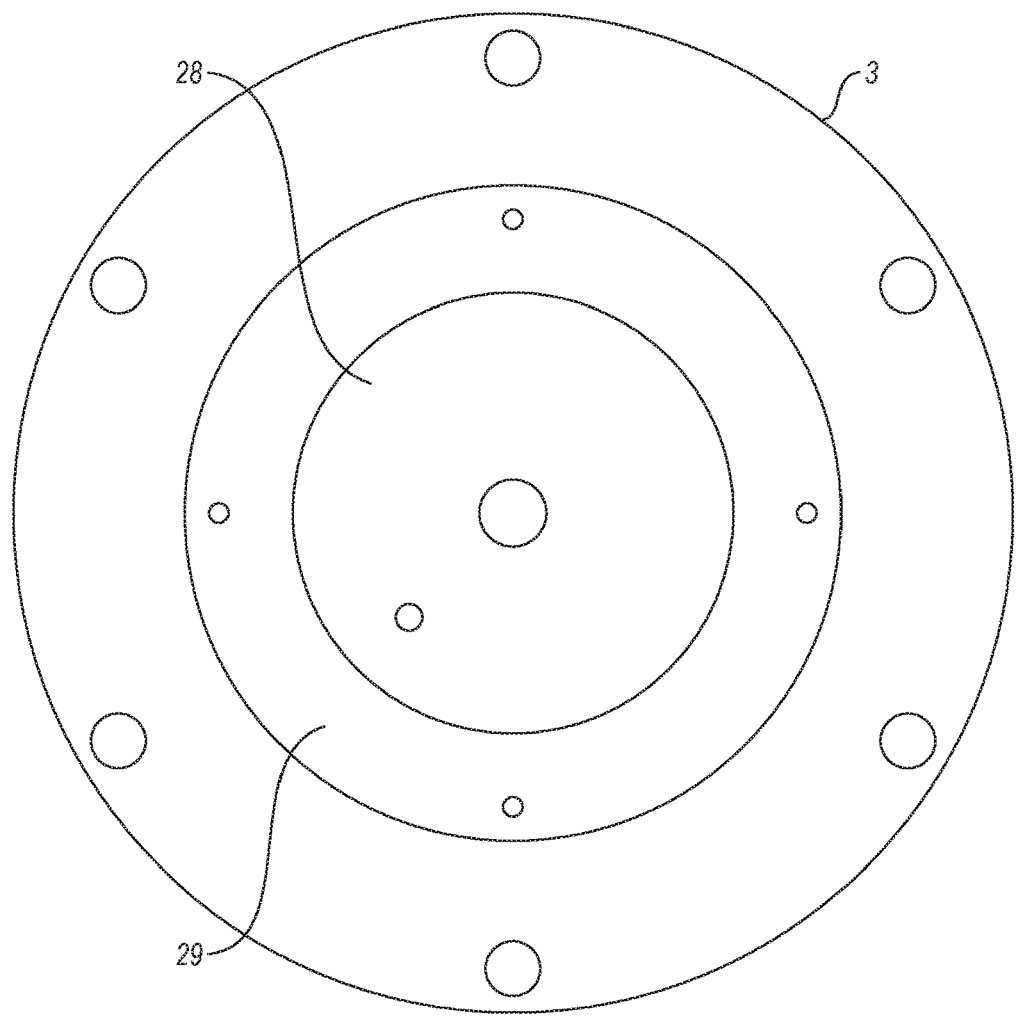
FIG. 8A depicts a top view of a housing top lid of a housing in accordance with embodiments described herein.
Figure 8B:
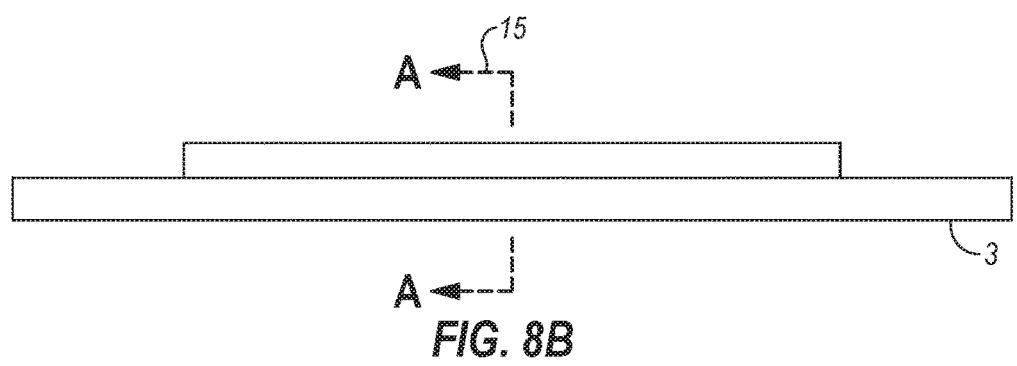
FIG. 8B depicts a side view of a housing top lid of a housing in accordance with embodiments described herein.
Figure 8C:
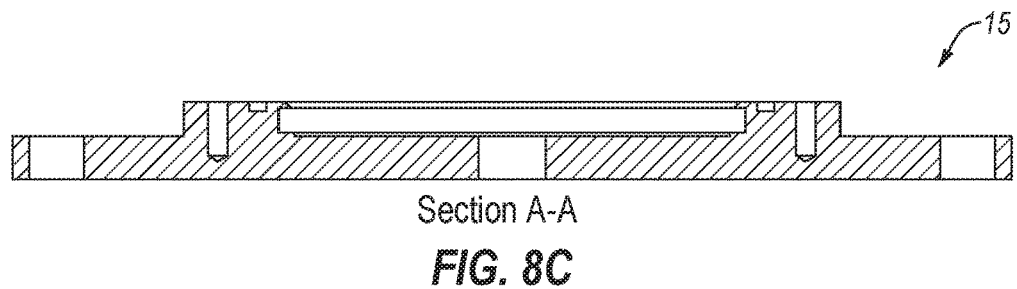
FIG. 8C depicts a side view of a housing top lid of a housing in accordance with embodiments described herein.

As shown in FIGS. 8A-8C, top plate 3 can be identical to bottom plate 1. According to embodiments, the top plate 3 can be configured to receive a mesh screen 28 (shown in FIG. 8B). The mesh screen 28 enables the filter housing 100 to hold granular chemical adsorption media without the need of a canister to be installed within the housing body 9. Mesh screen 28 may have a size of 120 (125 μm) to 170 (90 μm), or may have a size of 140 (105 μm). The chemical adsorption media may be sized for a diameter of about 0.2 mm to about 1.5 mm.

As shown in FIG. 8A, the top plate 3 can have a diameter of about 2.0 in to about 15.0 in, or about 10.2 in. The mesh screen 28 can be inserted into a center part of the top plate 3 and, according to various embodiments, can have a diameter of about 1 in to about 10 in, or about 4.445 in. The mesh screen 28 can include a flange 29 that holds the mesh screen to or within the top plate 3. The flange can have an outer diameter of about 1.5 in to about 12 in, or about 6.696 in. Further details of the mesh screen 28 are shown in the blown up schematic of FIG. 8C.

In embodiments, the design of the bottom plate 1 and the top plate 3 allows filter housing 100 to hold enough adsorption media (e.g., about 22 pounds to about 50 pounds) to treat lubrication systems greater 8,000 gallons. According to embodiments, the replaceable filtration canister 20 can hold about 5 pounds to about 25 pounds, or about 10 pounds to about 20 pounds, or about 12 pounds to about 14 pounds of granular media. The replaceable canister assembly 20 may include a top end plate 22 and a bottom end plate 23. The canister assembly 21 may also include a main body 24.

Figure 10A:
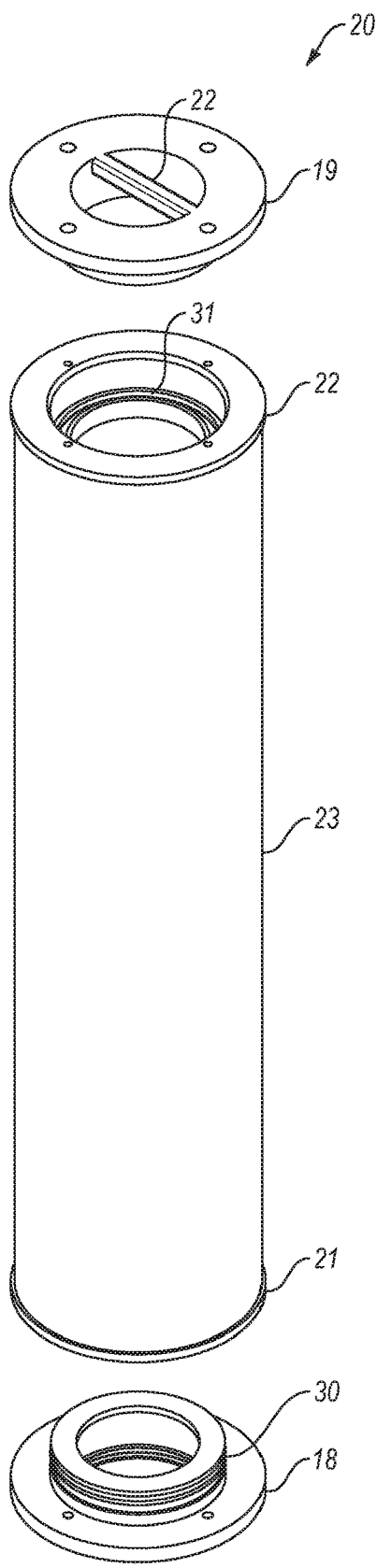
FIG. 10A depicts an exploded view of a replacement canister assembly in accordance with embodiments described herein.
Figure 10B:
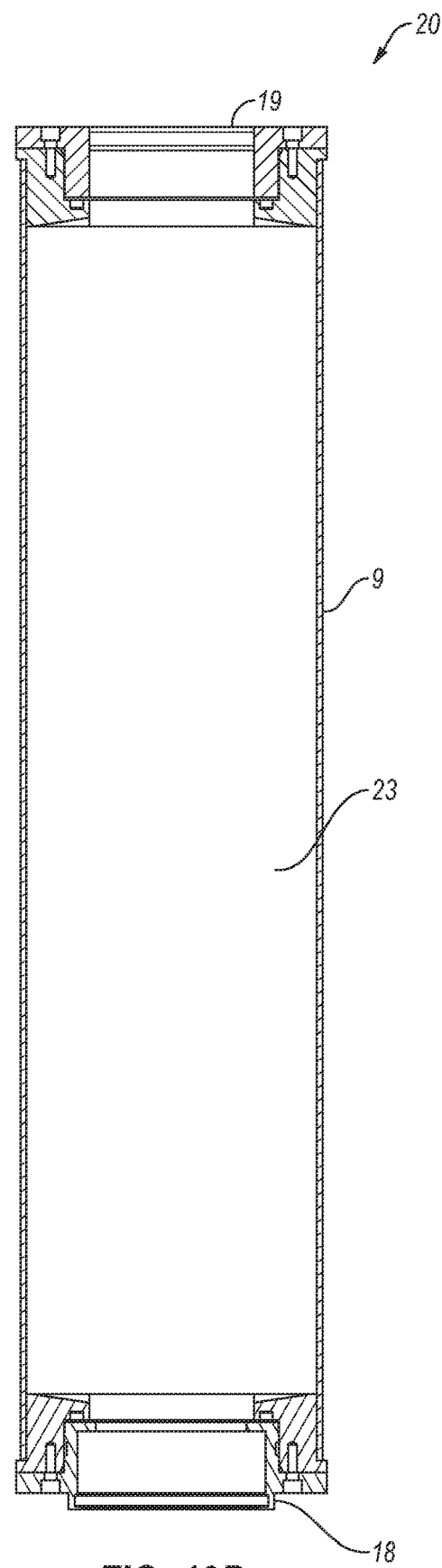
FIG. 10B depicts a replacement canister assembly in accordance with embodiments described herein.

According to various embodiments, filter housing 100 is also configured to hold a replaceable filter canister 20 as shown in FIGS. 9, 10A and 10B. For example, filter housing 100 is universal and can hold depth media as described above in FIGS. 6A-8C, or alternatively can hold a replaceable filter canister 20. In embodiments, bottom plate 1 and top plate 3 are configured to receive bottom canister lid 18 and top canister lid 18, respectively. Replaceable filter canister 20 can include a canister body 23 having a bottom canister flange 21 and a top canister flange 22. As shown in FIGS. 10A and 10B, bottom lid 18 and top lid 19 can be inserted into the canister body 23 to mate with a respective flange 21, 22. Bottom lid 18 and top lid 19 can be secured to the canister body 23 by any means known to those of ordinary skill in the art. For example, bottom lid 18 and top lid 19 can include a lip surrounded with an o-ring 30 that mates with a respective o-ring 22 inside the bottom part and the top part of the canister body 23. In embodiments, the bottom lid 18 and top lid 19 can be threaded into the canister body and/or mechanically formed to have, for example, a protrusion receivable by a corresponding depression within the canister body 23. As shown in FIG. 9, the canister body 23 can be cylindrical in shape and can have a length of about 10 in to about 40 in, or about 27.992 in and a diameter of about 2 in to about 15 in, or about 6.25 in or about 6.50 in.

Figure 11B:
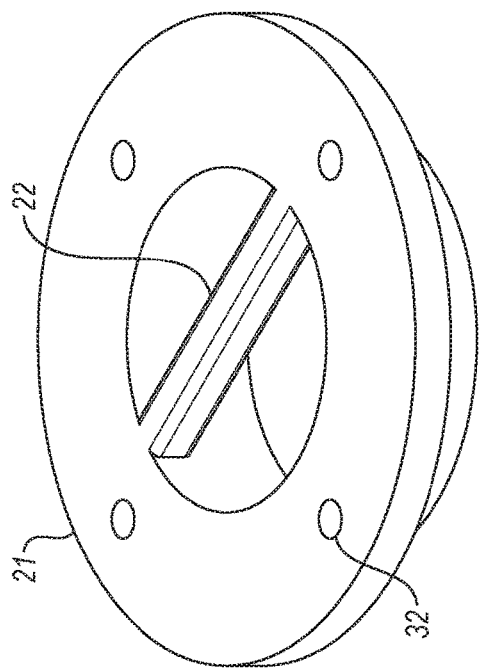
FIG. 11B depicts a perspective view of a top lid of a replacement canister assembly in accordance with embodiments described herein.
Figure 11D:
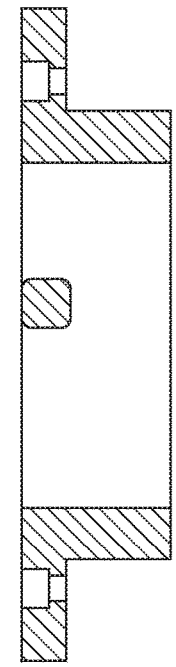
FIG. 11D depicts a blown up view of a top lid of a replacement canister assembly in accordance with embodiments described herein.
Figure 11A:
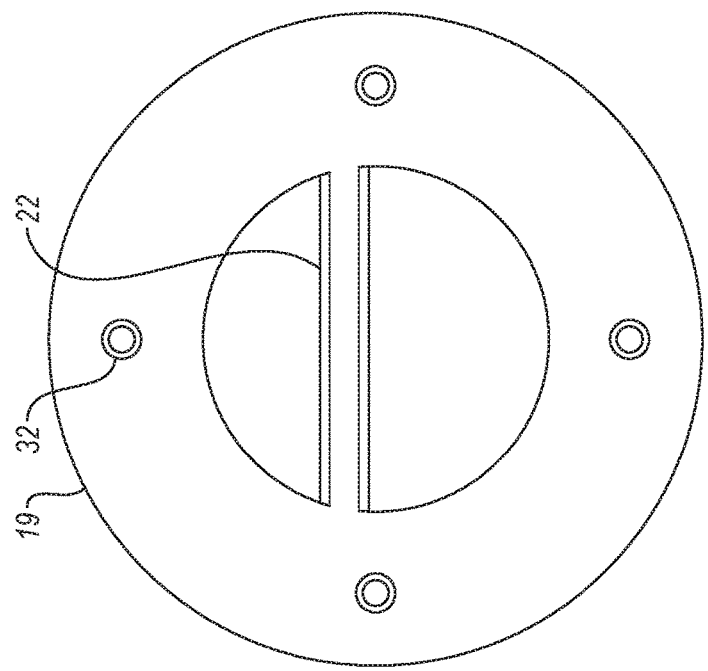
FIG. 11A depicts a top view of a top lid of a replacement canister assembly in accordance with embodiments described herein.
Figure 11C:
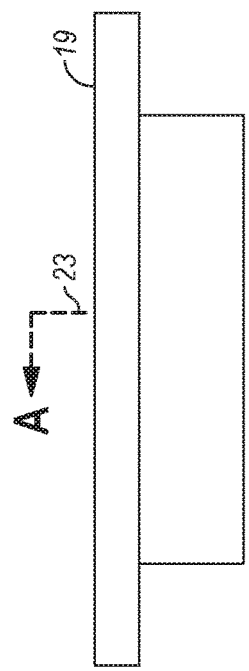
FIG. 11C depicts a side view of a top lid of a replacement canister assembly in accordance with embodiments described herein.

According to various embodiments as shown in FIG. 9 and FIGS. 11A-11B, bottom lid 18 and top lid 19 can include a handle 22 for gripping or turning the bottom lid 18 and top lid 19 as necessary. The bottom lid 18 and top lid 19 can be identical. In embodiments, the bottom lid 18 and top lid 19 can have an outer diameter of about 2 in to about 10 in, or about 6.688 in. The handle 22 an have a thickness of about 0.25 in to about 1.00 in, or about 0.50 in. The bottom lid 18 and top lid 19 can also include openings 32 to receive an attachment means such as a screw or bolt. Notably, openings are shown in various of the drawings and similarly, according to embodiments, can receive attachment means. FIGS. 11C and 11D show detail views of top lid 19. According to embodiments, bottom lid 18 and top lid 19 can have the dimensions as shown in FIGS. 11C and 11D.

FIGS. 12A-12D show yet additional dimensions of top lid 19. As discussed, bottom lid 18 can be identical top lid 19. As shown in FIGS. 12A and 12C, top lid 19 can include a recess 33. The recess 33 can receive an o-ring or can receive a corresponding protrusion inside the canister body 23. The recess 33 enables the top lid 19 to be secured to the canister body 23 and to form a seal. According to embodiments, recess 33 can have a thickness of about 0.1 in to about 0.5 in, or about 0.26 in. As shown in FIGS. 12C-12D, the top lid 19 can be adjoined within the canister body 23 to form a seal and may have the dimensions as shown in these drawings. FIG. 12D is a blow up of detail F 25 shown in FIG. 12C.

According to certain embodiments, disclosed herein is a modular filter apparatus, comprising a particulate filter, a depth media filter and an ion exchange filter. The modular filter apparatus can include center post assembly 500. The modular filter apparats further can include a media filter stacking component in a series or parallel configuration. In embodiments, the modular filter apparatus can include a bottom plate and an adapter plate to accommodate the different filter media.

The replaceable filter canister 20 configuration together with the universal filter housing 100, enables the replacement of a lower cost canister and avoids the replacement of the entire filter housing or the need for media to be recharged in the field. The recharging is difficult to actually execute at the customer site because the media may be laden with oil and the particles may be difficult to manage from a housekeeping point of view. The above described configurations set forth in FIGS. 1-12 have different maximum pressure drops that are allowable due to the fact that pressure drop is a function of various parameters. These parameters include the media resistivity to flow, the diameter and length of the canister, the viscosity of the fluid and the flow rate of oil going past the filtration media.

According to various embodiments, the filter housing 100, center rod 200 and replaceable canister assembly 21 may be constructed of various materials including plastics and metals. Suitable plastics include, but are not limited to, polyethylene terephthalate (PET or PETE), high-density polyethylene (HDPE), polyvinyl chloride (PVC), low-density polyethylene LDPE), polypropylene (PP), polystyrene, acrylic, polyurethanes, epoxides, phenolic resins, silicone, styrene, ethylene-propylene-diene monomer (EPDM), nitrile, polybutadiene, polycarbonate, any thermoforming and thermosetting plastics, fibers and polymers. Suitable metals include, but are not limited to, aluminum, steel, carbon steel, steel alloys, copper, magnesium and iron.

Figure 13A:
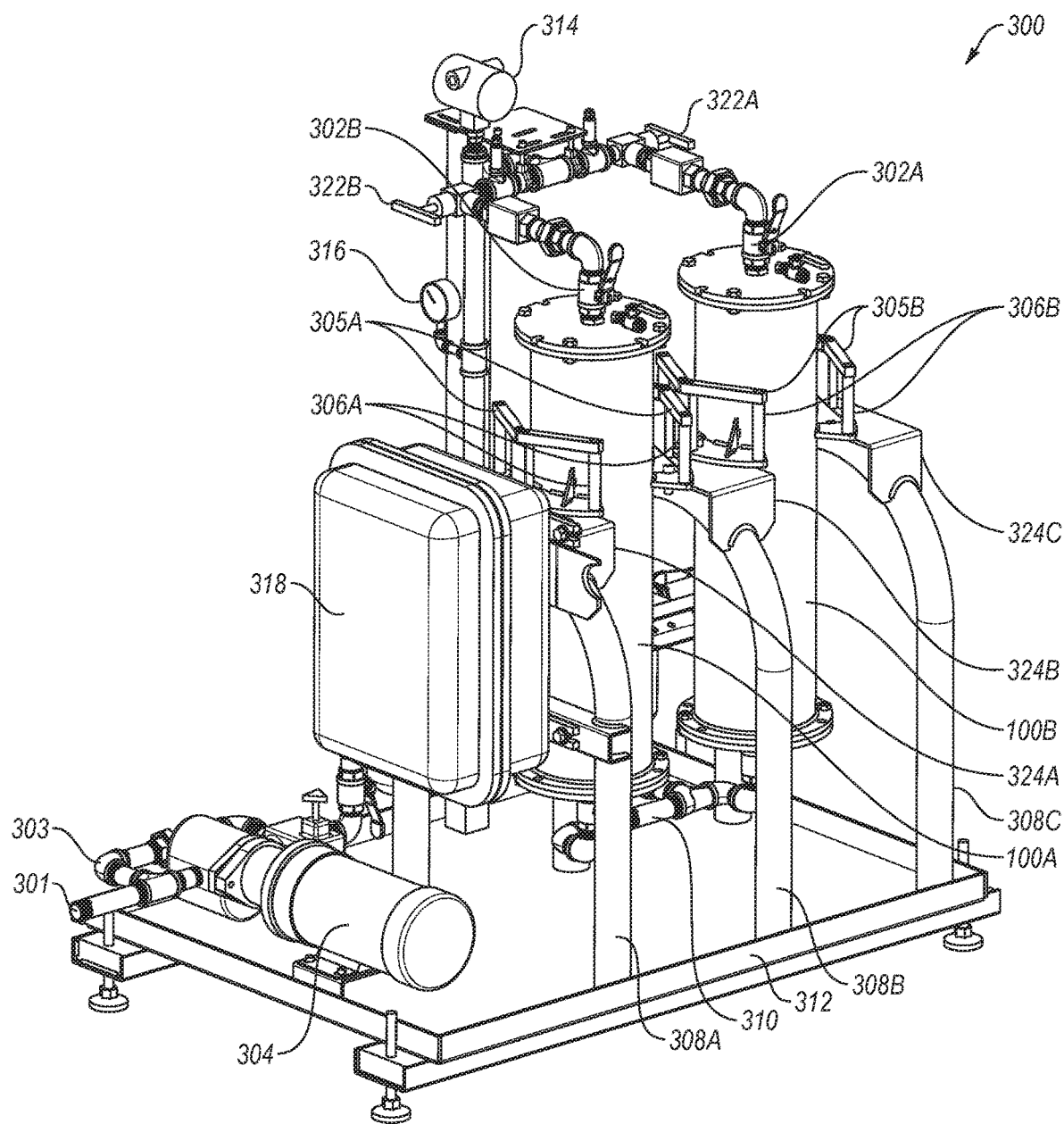
FIG. 13A depicts an oil purification skid in accordance with embodiments described herein.
Figure 13B:
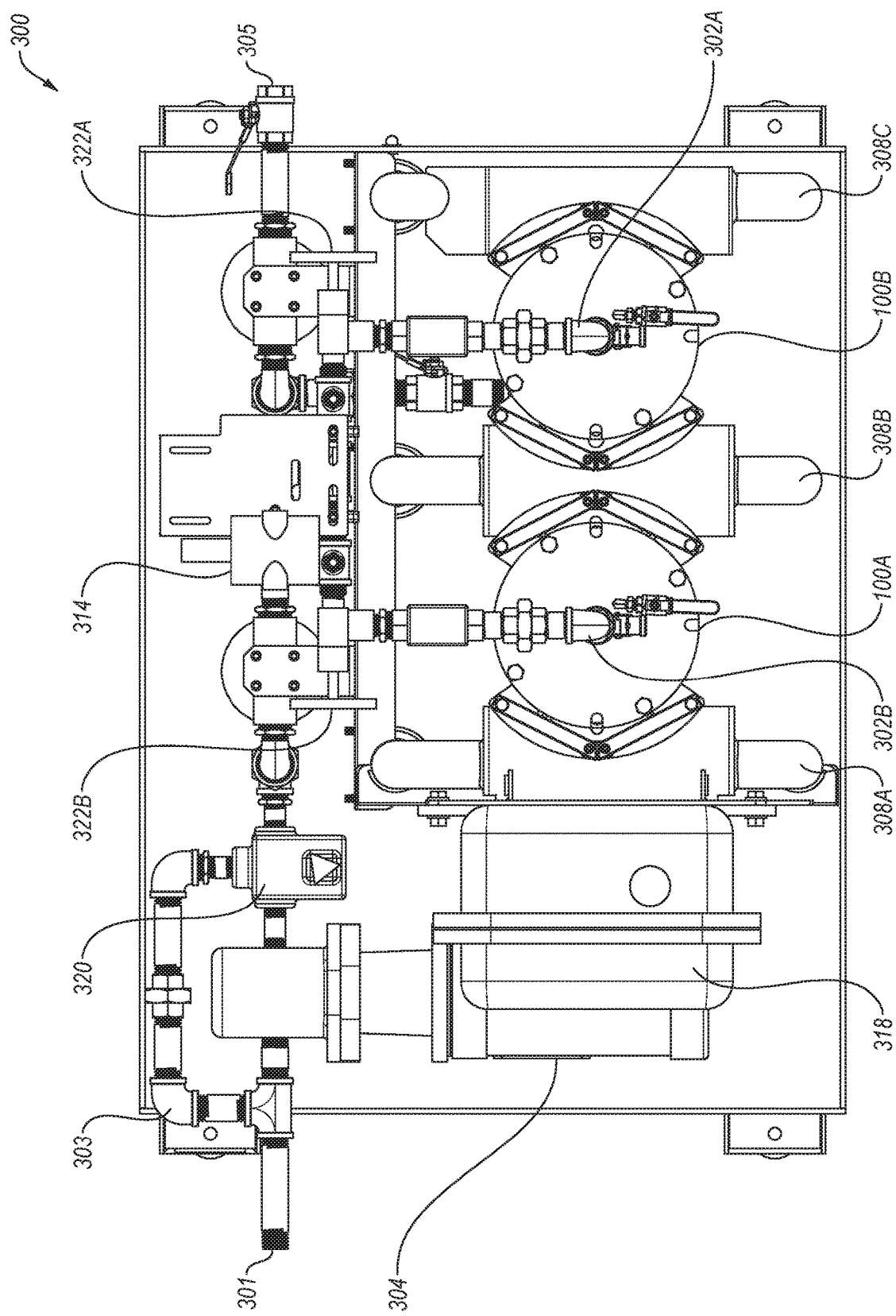
FIG. 13B depicts a top view of an oil purification skid in accordance with embodiments described herein.

In yet further example embodiments, the filter housing 100 and/or replaceable canister 20 can be included in an equipment skid 300 (e.g., a modular filter apparatus) as shown in FIGS. 13A-13B. The equipment skid 300 can provide variable flow control through filters installed therein and can adjust pressure drop to remain below the maximum allowable pressure drop for each media and canister design. For example, the equipment skid 300 can include a variable control fluid distribution unit 304 (e.g., a pump) to control the flow rate and pressure drop throughout the equipment skid 300. Additionally, the equipment skid 300 can include a plurality of valves to direct flow through piping in the equipment skid 300. The variable flow skid can be equipped with a filter housing capable of accommodating multiple filtration technologies as described above. Additionally, the equipment skid 300 can include flow control valves and a pressure relief valve with its own recirculation loop. This allows the user to control flow rates going past the media while not exceeding the rated maximum pressure while the skid accommodates excess flow with a spring-loaded pressure relief valve and a recirculation loop.

With reference to FIGS. 13A and 13B, fluid (e.g., a lubricant, oil, water, etc.) can flow into skid 300 via inlet

301. The fluid can exit skid 300 via outlet 305 as shown in FIG. 13B. According to embodiments, a pump 304 (e.g. a positive displacement pump, a centrifugal pump, a diaphragm pump, a peristaltic pump, etc.) can be used to draw the fluid into the inlet 301 and pump the fluid through the piping in skid 300 and into one or more filter 100A, 100B installed therein. In certain embodiments, when the fluid is a pressurized supply to skid 300 having sufficient pressure, the fluid can bypass the pump 304 via bypass line 303. Located downstream from pump 304 (and bypass line 303) is a flow control valve 320 (or a back pressure valve) to help control fluid flow into the one or more filter 100A, 100B.

According to embodiments, for example, when at least two filters 100A, 100B are installed, the filters 100A, 100B can operate in a parallel configuration or a series configuration depending on the type of filter media (discussed above) installed in the skid 300. According to embodiments, valves can be controlled and sequenced (i.e., opened, closed, activated, deactivated) to direct fluid flow through the filters in either the parallel or series configurations as would be understood by those of ordinary skill in the art. The skid 300 can include a control box 318 that can house electrical components and optionally a programmable logic controller (PLC) to control one or more valves 302A, 302B, 314, 320, 322A, 322B and pump 304. In embodiments, the valves can be manual, electrical, solenoid and/or mechanical. According to embodiments, valve 314 is a pressure relief valve that is configured to release excess pressure within the piping. As discussed above, skid 300 can control pressure in the system such that it does not exceed a maximum pressure drop across the one or more filters 100A, 100B. A pressure gauge 16 can be installed in line 326 to monitor the pressure of fluid flowing through the system.

During operation, fluid can flow from inlet 301 through pump 304 (or bypass 303) and into the bottom of one or more of filter housing 100A, 100B. Alternatively, the valves can be sequenced to allow fluid to flow into the top of filter housing 100A, 100B. Fluid flowing out of filter housing 100A, 100B can be directed through the piping monitored by the pressure relief valve 314 and to the outlet 305 of the skid 300.

The skid 300 can include one or more support brackets 308A-308C as necessary on which the filters 100A, 100B can be removably seated. For example, if a third filter (not shown) is installed in the skid, the skid will contain a fourth support bracket (not shown) and so on. As shown in FIG. 13A, in embodiments, the handles 305, 306 of each filter 100A, 100B can be seated on and/or attached to supports 324A-324C. The one or more brackets 308A-308C can be attached to a base 312 of the skid 300. All of the skid components including can be installed on and supported by base 312. Because the filter housings 100 are universal and exactly the same, the skid 300 can be easily scaled to accommodate numerous filter housings, each of which can accommodate a variety of types of filter media as described above. Utilizing universal filter housings 100 that can include a mesh support 26, 28 and/or a replaceable canister assembly 20 reduces costs and the necessity to build unique skids for each brand and type of filter.

In certain embodiments, a method of using the filter housing 100 is provided. The housing can encompass three types of filter configurations. The filter can be sealed with a top plate and a bottom plate. The bottom plate can have at least three different configurations. A first configuration for filling the housing with the media, a second configuration for an element inside the housing and a third configuration for using the depth media filter, a particulate media filter, a pleated membrane filter and/or a coalescing filter along with the center post assembly in the housing. According to various embodiments, the filter medium can include, but is not limited to, styrene, acrylic, silica gel, epoxy, fuller's earth, earth clay, microfiber glass, sulphone, cellulose, activated carbon, activated alumina, polystyrene, nylon, poly propylene, cellulose acetate, cellulose ester, polycarbonate polyvinyl, polytetrafluoroethylene, nitrocellulose polyamide inorganic and composite material. The filtration media may be in the form of spherical beads, a cylindrical pleated membrane and/or stacked layer of the above-mentioned material.

The preceding description sets forth numerous specific details such as examples of specific systems, components, methods, and so forth, in order to provide a good understanding of the several embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the disclosed embodiments. Thus, the specific details set forth are merely exemplary. Particular embodiments may vary from these exemplary details and still be contemplated to be within the scope of the disclosure.

It is to be understood that the invention described herein is not limited to the details of construction or process steps set forth in the following description. The invention is capable of other embodiments and of being practiced or being carried out in a variety of ways.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

As used herein, the singular forms "a," "an," and "the" include plural references unless the context clearly indicates otherwise. Thus, for example, reference to "a catalyst material" includes a single catalyst material as well as a mixture of two or more different catalyst materials.

As used herein, the term "about" in connection with a measured quantity, refers to the normal variations in that measured quantity as expected by one of ordinary skill in the art in making the measurement and exercising a level of care commensurate with the objective of measurement and the precision of the measuring equipment. In certain embodiments, the term "about" includes the recited number ±10%, such that "about 10" would include from 9 to 11.

The term "at least about" in connection with a measured quantity refers to the normal variations in the measured quantity, as expected by one of ordinary skill in the art in making the measurement and exercising a level of care commensurate with the objective of measurement and precisions of the measuring equipment and any quantities higher than that. In certain embodiments, the term "at least about" includes the recited number minus 10% and any quantity that is higher such that "at least about 10" would include 9 and anything greater than 9. This term can also be expressed as "about 10 or more." Similarly, the term "less than about" typically includes the recited number plus 10% and any quantity that is lower such that "less than about 10" would include 11 and anything less than 11. This term can also be expressed as "about 10 or less."

Unless otherwise indicated, all parts and percentages are by weight. Weight percent (wt. %), if not otherwise indicated, is based on an entire composition.

Although the disclosure herein is with reference to particular embodiments, it is to be understood that these embodiments are merely illustrative of the principles and applications of the invention. It will be apparent to those skilled in the art that various modifications and variations can be made to the compositions and methods without departing from the spirit and scope of the invention. Thus, it is intended that the invention include modifications and variations that are within the scope of the appended claims and their equivalents.

Although the operations of the methods herein are shown and described in a particular order, the order of the operations of each method may be altered so that certain operations may be performed in a different order, for example, an inverse order, or so that a certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of ordinary skill in the art upon reading and understanding the above description. The scope of the disclosure should, therefore, be determined with reference to the appended claims, along with the full scope of equivalents to which such claims are entitled.

What is claimed is:

1. An oil filter housing, the oil filter housing comprising:
a housing body configured to house the one or more oil filters, the housing body comprising a flange on a top end and a flange on a bottom end;
the top end comprising a top plate and a top o-ring;
the bottom end comprising a bottom plate and a bottom o-ring;
and an attachment fixture coupled to an exterior of the housing body.

2. The oil filter housing of claim 1, wherein the housing body is cylindrical.

3. The oil filter housing of claim 1, wherein the housing body is a tube.

4. The oil filter housing of claim 1, wherein the housing body comprises a plastic or a metal.

5. The oil filter housing of claim 1, wherein the housing body comprises at least one of polyethylene terephthalate, high-density polyethylene, polyvinyl chloride, low-density polyethylene, polypropylene, polystyrene, acrylic, polyurethanes, epoxides, phenolic resins, silicone, styrene, ethylene-propylene-diene monomer, nitrile, polybutadiene, polycarbonate, a thermoforming plastic, a thermosetting plastic, aluminum, steel, carbon steel, steel alloys, copper, magnesium and iron.

6. The oil filter housing of claim 1, wherein the top plate comprises a plurality of orifices.

7. The oil filter housing of claim 1, wherein the attachment fixture is configured to releasably attach the oil filter housing to at least one skid.

8. The oil filter housing of claim 1, wherein the attachment fixture comprises one or more handle assemblies, the one or more handle assemblies configured to enable one or more of: lifting, lowering, or carrying of the oil filter housing by an operator.

9. The oil filter housing of claim 1, further comprising a center rod assembly for stacking depth media and particle filters.

10. The oil filter housing of claim 1, wherein the bottom plate comprises a support mesh and a mesh holder.

11. The oil filter housing of claim 1, further comprising a replaceable canister assembly.

12. The oil filter housing of claim 11, wherein the replaceable canister assembly comprises end fittings on opposed ends of a main body of the canister assembly.

13. An oil purification skid for purifying oil, the oil purification skid comprising: one or more oil filter housings, the one or more oil filter housings configured to house one or more oil filters, each oil filter housing of the one or more oil filter housings comprising:
a housing body configured to house the one or more oil filters comprising a flange on a top end and a flange on a bottom end;
the top end comprising a top plate and a top o-ring;
the bottom end comprising a bottom plate and a bottom o-ring;
an attachment fixture coupled to an exterior of the housing body;
a plurality of valves; and
a fluid distribution unit configured to flow oil through the one or more oil filter housings.

14. The oil purification skid of claim 13, wherein the housing body is cylindrical.

15. The oil purification skid of claim 13, wherein the housing body is a tube.

16. The oil purification skid of claim 13, wherein the housing body comprises at least one of polyethylene terephthalate, high-density polyethylene, polyvinyl chloride, low-density polyethylene, polypropylene, polystyrene, acrylic, polyurethanes, epoxides, phenolic resins, silicone, styrene, ethylene-propylene-diene monomer, nitrile, polybutadiene, polycarbonate, a thermoforming plastic, a thermosetting plastic, aluminum, steel, carbon steel, steel alloys, copper, magnesium and iron.

17. The oil purification skid of claim 13, wherein the top plate comprises a plurality of orifices.

18. The oil purification skid of claim 13, wherein the attachment fixture is configured to releasably attach the oil filter housing to the oil purification skid.

19. The oil purification skid of claim 13, wherein the attachment fixture comprises one or more handle assemblies.

20. A modular filter apparatus, comprising:
a particulate filter, a depth media filter and an ion exchange filter;
a center post assembly;
a media filter stacking component in a series or parallel configuration;
a bottom plate; and
an adapter plate.

* * * * *